Sept. 26, 1967            A. LIVNAT            3,343,618
AUTOMOBILE BUILT-IN PARKING DEVICE
Filed June 13, 1966                          5 Sheets-Sheet 5
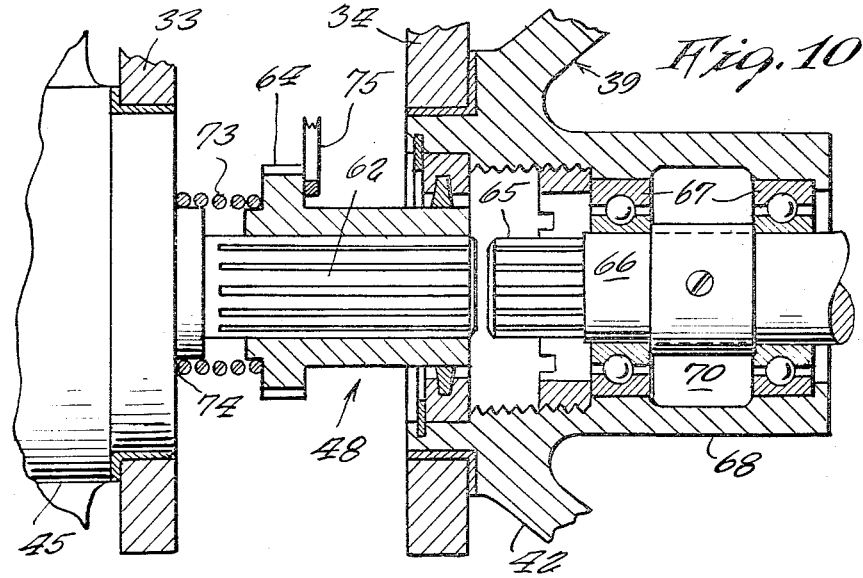
Fig. 10
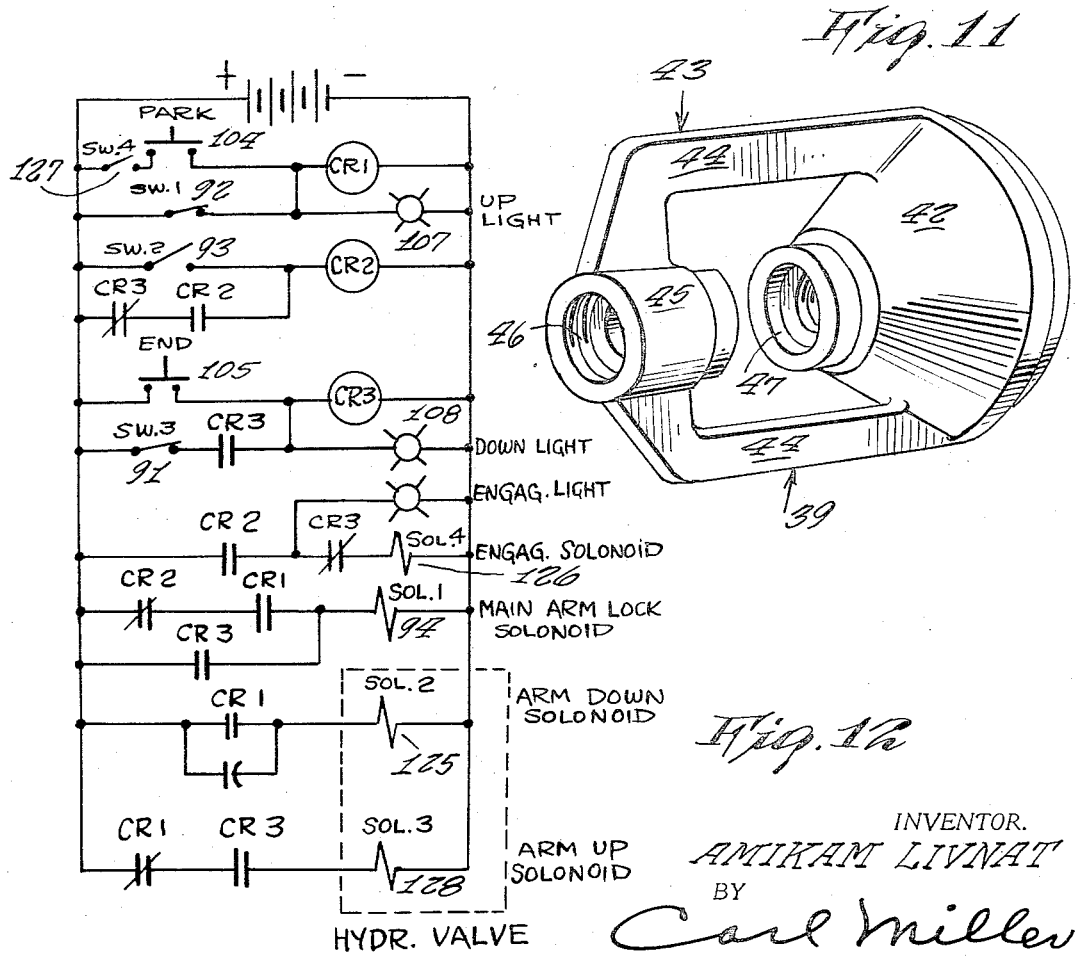
Fig. 11
Fig. 12
INVENTOR.
AMIKAM LIVNAT
BY
Carl Miller
ATTORNEY United States Patent Office 3,343,618
Patented Sept. 26, 1967

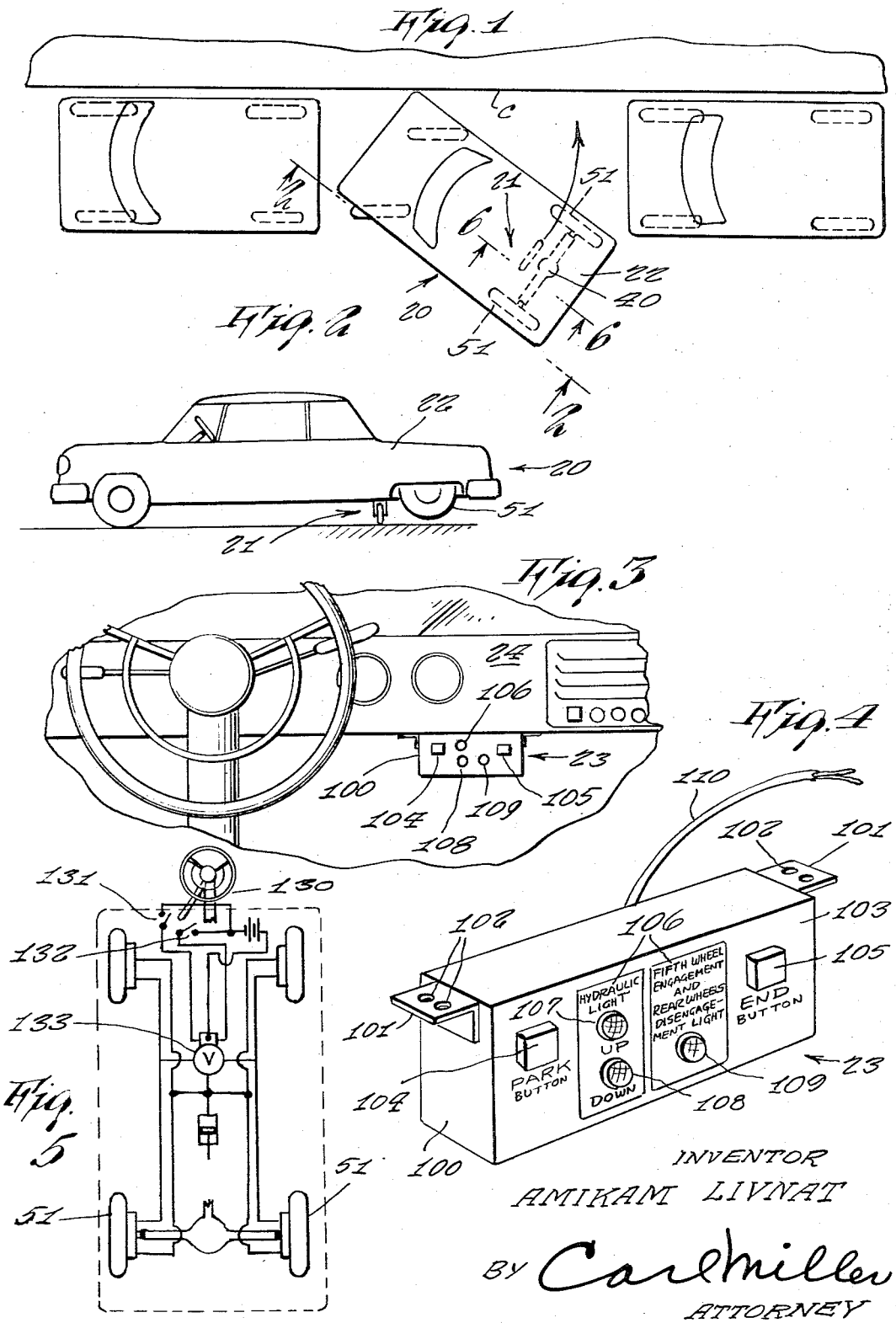

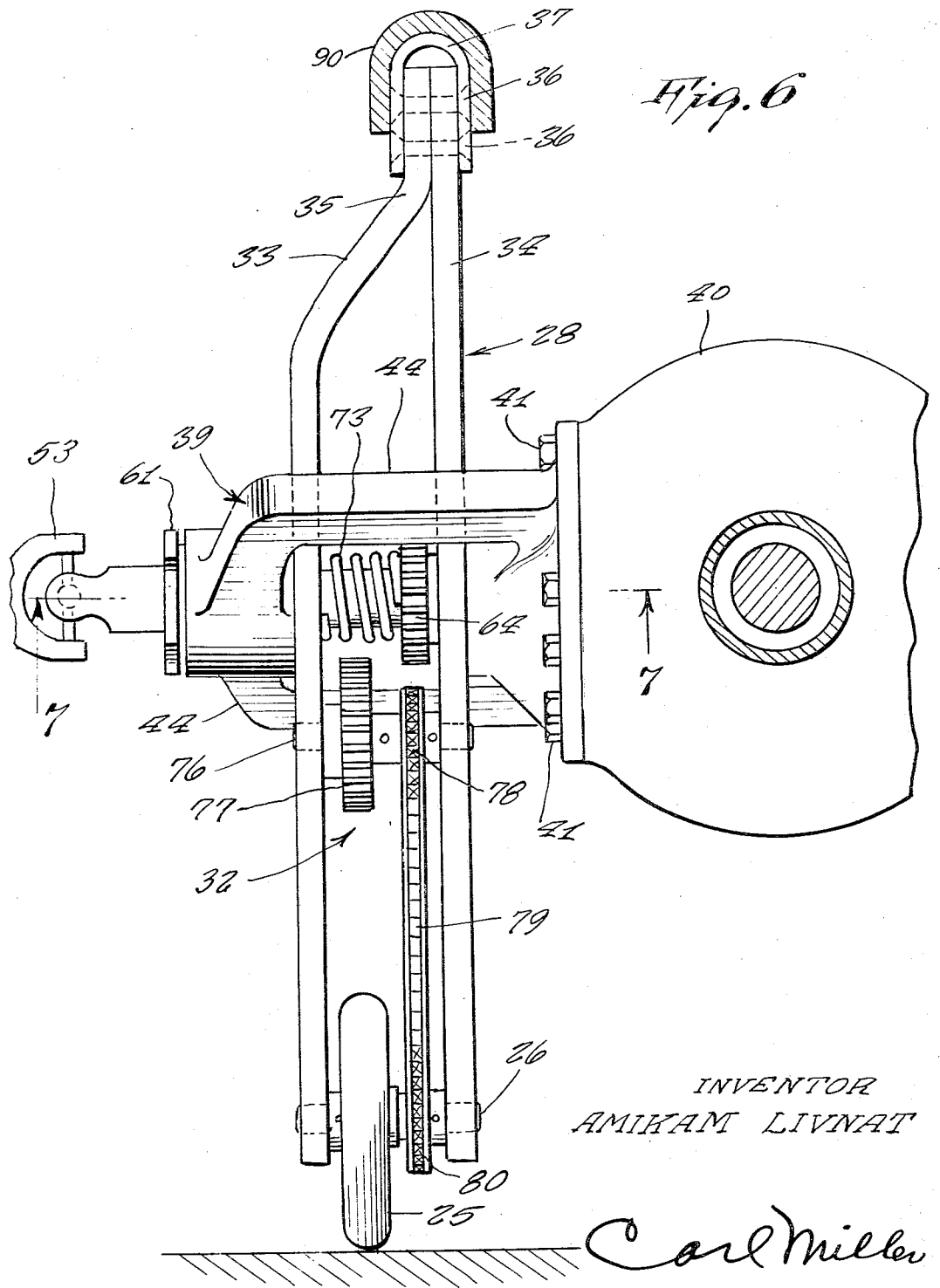

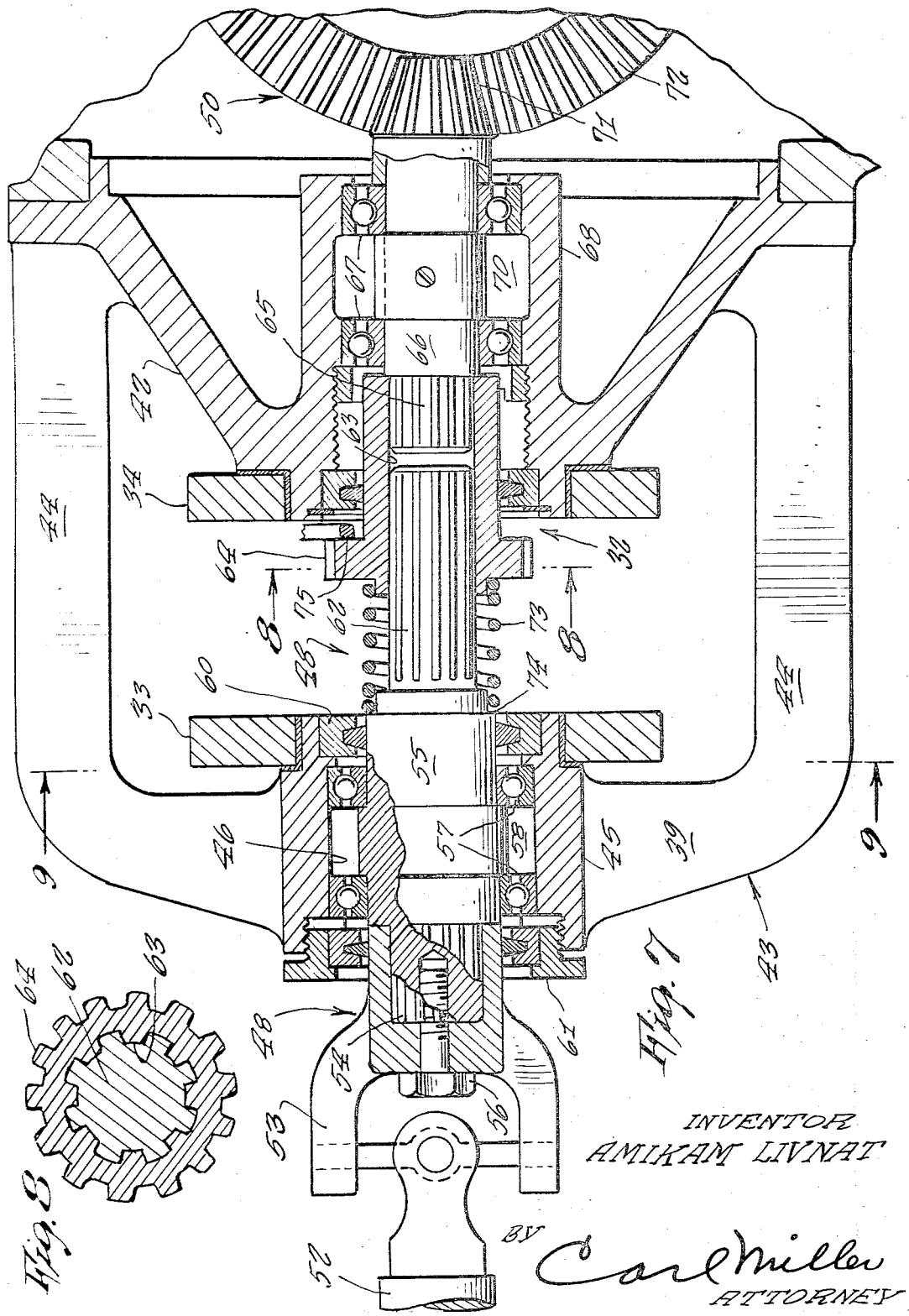

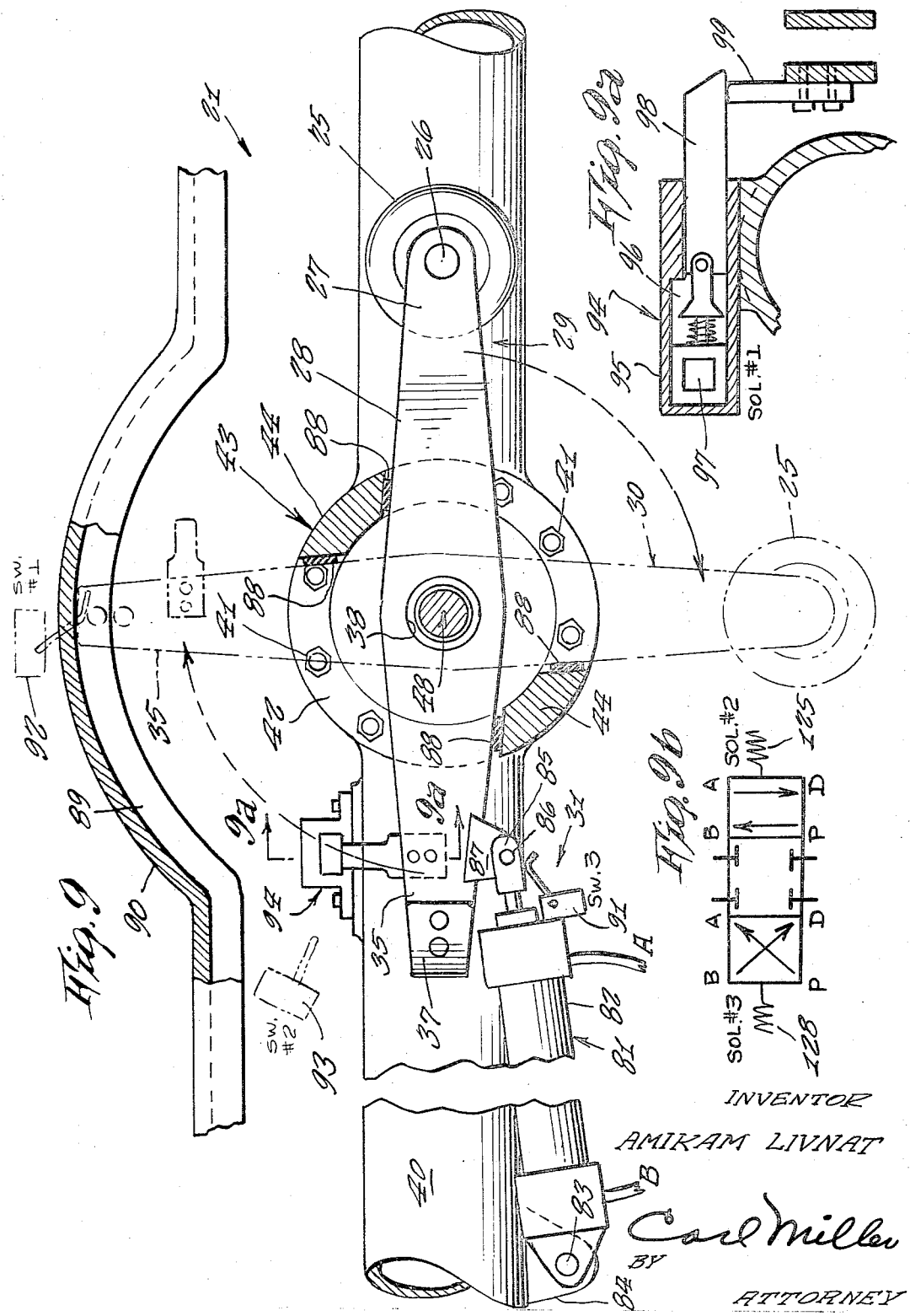

3,343,618
AUTOMOBILE BUILT-IN PARKING DEVICE
Amikam Livnat, 96—02 57th Ave.,
Lefrak City, N.Y. 11368
Filed June 13, 1966, Ser. No. 557,265
3 Claims. (Cl. 180—1)

ABSTRACT OF THE DISCLOSURE

A device built into an automobile for parking the vehicle within an excessively limited space between other vehicles and wherein the automobile is driven into the space with the front end first, and the rear end is then pivoted into the space by the device which constitutes a downwardly movable fifth wheel under the rear end of the automobile, the fifth wheel being rotatable about an axis along the longitudinal plane of the car so as to travel in a sidewardly direction to bring the car rear end toward the curb, the fifth wheel being sufficiently downwardly movable to raise the car rear wheels off the ground for the pivotal travel, the fifth wheel being then raised after the car is parked so to lower the rear wheels to the ground, the fifth wheel being driven by the vehicle engine and controlled from the dash board by the driver, the device accordingly including a hydraulic lift jack and electrical controls for operating the jack and a power drive to the fifth wheel.

---

This invention relates generally to automotive vehicles. More specifically, it relates to such vehicles that incorporate mechanisms to aid the vehicle to park alongside a curb in a relatively limited length of space between other automobiles.

A principal object of the present invention is to provide an automotive vehicle having a built-in mechanism for making possible to move into or out of a limited length of parking space, and wherein the mechanism is entirely controlled by the driver while at the steering wheel.

Another object of the present invention is to provide an automotive vehicle having a built-in parking mechanism which permits bringing the front wheels into the parking space first, thereby eliminating the rearward movement in the road right-of-way, as is conventionally practiced, and which ties up following traffic during this additional maneuvering.

Another object is to provide an automobile having a built-in parking mechanism which may be added into existing cars or which may be incorporated into new vehicles during their manufacture.

Yet another object is to provide an automobile having a built-in parking mechanism which can park the car within limited spaces on either the right or left sides of the road.

Yet another object is to provide an automobile parking device which may be utilized to change a flat tire.

Yet another object is to provide an automobile parking device which may be used to make a relatively sharp U-turn within a narrow area, such as in a dead end street, or the like.

Other objects are to provide an automobile having a built-in parking mechanism which is simple in design, relatively inexpensive to manufacture, rugged in construction, easy to use and efficient in operation.

These and other objects will be readily evident upon a study of the following specification and the accompanying drawings, wherein:

FIGURE 1 is a top plan view of an automobile in a parking operation and shown incorporating the present invention;

FIGURE 2 is a side elevation view thereof;

FIGURE 3 is a fragmentary elevation view of the dashboard showing the parking control unit secured thereto;

FIGURE 4 is a perspective view of the dashboard control unit;

FIGURE 5 is a diagrammatic view of an optional hydraulic system of the invention applied to a dual brake line system;

FIGURE 6 is an enlarged cross-sectional view taken on the line 6—6 of FIGURE 1;

FIGURE 7 is a cross-sectional view taken on the line 7—7 of FIGURE 6;

FIGURE 8 is a cross-sectional view taken on the line 8—8 of FIGURE 7;

FIGURE 9 is a cross sectional view taken on the line 9—9 of FIGURE 7;

FIGURE 9a is a cross sectional view taken on the line 9a—9a of FIGURE 9;

FIGURE 9b is a diagrammatic view of a double acting solenoid valve that is used in the present invention;

FIGURE 10 is a cross-sectional view similar to FIGURE 7 and shown in an alternate position;

FIGURE 11 is a perspective view of the combination differential cover plate and parking mechanism support bracket; and FIGURE 12 is an electrical circuit of the invention.

Referring now to the drawings in detail, the numeral 20 represents an automotive vehicle incorporating the present invention and wherein there is a fifth wheel unit 21 under the rear part of the automobile body 22, the unit 21 being remotely controlled by a control unit 23 on the dashboard 24 of the car.

The fifth wheel unit

The fifth wheel unit 21 is comprised of a tire-covered wheel 25 supported rotatably free on a shaft 26 mounted at one end 27 of centrally pivoted arm 28 which is operated between a retracted position 29 and an extended position 30 by means of an electrically controlled hydraulic system 31, and the wheel 25 being powered by an electrically controlled transmission system 32.

The arm 28 is comprised of a pair of steel bars 33 and 34, which are strong enough to support the weight of the rear of the vehicle. At one end 35 of the arm, the bars are adjacent each other and secured together by rivets 36, the rivets also securing a shoe 37 of U-shaped configuration over the ends of the bars, as shown in FIGURE 6. The bars at the mid-portion and opposite end 27 of the arm are spaced parallel apart so to support the ends of the shaft 26 and contain the wheel 25, mounted on shaft 26, therebetween.

At approximately its mid-portion, each bar has an opening 38 in alignment with each other for purpose of supporting the arm pivotally free on a combination differential cover plate and support bracket 39, which is secured to the front side of the automobile differential case 40 by means of bolts 41.

The cover plate and bracket 39 are comprised of a circular cover plate element 42 and a bracket element 43 which are integrally forged or otherwise formed together to provide a strong construction. The bracket element includes a pair of arm elements 44 which support a hub 45 in spaced apart position from the plate element 42; the hub having a central opening 46 therethrough which is in axial alignment with an opening 47 in the plate element 42; the openings 46 and 47 providing bearing support means for a drive shaft assembly 48 that transmits power from the automobile engine in the front of the automobile to the differential unit 50 that delivers the power to the rear wheels 51 of the car.

In the present invention, power from the engine is delivered from a drive shaft 52 to a universal joint 53 which is spline mounted as shown at 54 to one end of a first stub shaft 55 and then secured thereto by a bolt 56. The stub shaft is supported on bearings 57 held within opening 46, the bearings 57 being enclosed within a chamber 58 formed by means of dust barriers (oil retainers) 59 and 60 at each end. A lock nut 61, threadingly secured to the hub 45 retains dust barrier 59 while the dust barrier 60 is press-fitted into the other end of the hub. The stub shaft 55 includes a splined opposite end 62 which is in continuous engagement with a splined opening 63 in a gear 64. The splined opening 63 is also disengageably connected to a splined end 65 of a second stub shaft 66 supported in bearings 67 mounted within a central hub 68 formed in the cover plate element 42. A dust barrier (oil retainer) 69 seals the chamber 70 containing the bearings 67 thereby preventing entry of dust therein. The opposite end of stub shaft 66 has a bevel gear 71 mounted thereupon which is in engagement with a gear 72 within the transmission case 40. A compression coil spring 73, between a shoulder 74 on the first stub shaft 55 and one side of gear 64 normally urges the splined opening 63 of gear 64 to remain in connection with splined end 65 of the second stub shaft 66. A clutch 75 (shown only fragmentarily in FIGURE 7), bears against the opposite side of gear 64; the clutch being electrically operated from the dashboard by the driver to cause the spline 62 and shaft 66 to disengage.

The arm 28 is also provided with a cross shaft 76 mounted rotatably free at each end in each of the bars 33 and 34; the cross shaft having a gear 77 and a sprocket 78 affixed thereto. The gear 77 is in a position for being engaged by gear 64 at such time when the clutch 75 slides the gear 64 along the splined end 62 of stub shaft 55. The sprocket 78 is engaged by an endless sprocket chain 79 that is also engaged around a sprocket 80 affixed on the wheel shaft 26, as shown in FIGURE 6.

The arm 28 is pivotable about the hubs 45 and 68 of the combination cover plate and bracket 39, as above stated. Power for this pivotal movement is provided by a hydraulic cylinder assembly 81 (shown in FIGURE 9) one end of the cylinder 82 thereof being mounted pivotally free on a pin 83 supported on a bracket 84 welded or otherwise secured on the rear axle case 40. The piston 85 thereof is attached pivotally free on a pin 86 supported on a bracket 87 mounted on the end 35 of the arm 28.

The arm 28 is movable between a retracted position as is indicated by the solid lines in FIGURE 9 and an operating position as indicated by phantom lines in the same figure. It will be noted that the pivotal movement thereof will be limited by the distance between the arm elements 44. Each of arm elements is accordingly provided with resilient pads 88 on each side for purpose of cushioning the contact with the arm.

During the pivotal travel of the arm, the shoe 37 thereof comes into engagement within a groove 89 of a channel 90, as the arm assumes a vertical position; the channel 90 providing a strong support for the arm in vertical position, at which time the weight of the rear of the automobile is made thereupon.

During its pivotal travel, the arm comes into engagement with three micro switches which automatically thus actuate electrical circuits. These comprise a switch 91 which is engaged when the arm attains a horizontal, fully retracted position, a switch 92 which is engaged when the arm attains a vertically upright position and a switch 93 which is engaged when the arm is on an intermediate position between opposite ends of its travel.

When the arm is in a fully retracted horizontal position it is secured by a solenoid 94 mounted on the differential case 40. The solenoid 94 is comprized of a housing 95 enclosing a compartment 96 containing a solenoid mechanism 97 and a slidable solenoid arm 98 which is slidable outwardly of the housing and into the path of a lug 99 secured by bolts to the arm.

The control unit

The control unit 23 mounted on the dashboard comprises a case 100 having brackets 101 for purpose of receiving mounting screws through openings 102 provided therein.

Upon the front panel 103 thereof, there are a pair of manually operated push buttons, one of which is identified as a "Park" push button 104, and the other of which is identified as an "End" push button 105.

The front panel additionally carries three lamps, each of which is clearly identified by leg end 106 on the panel. These comprise a "hydraulic up" lamp 107, a "hydraulic down" lamp 108 and a fifth wheel engagement and rear wheel disengagement lamp 109. An appropriate electric cable 110 communicates between the control unit and electrical components remotely located on the vehicle for operating the fifth wheel unit 21.

Operation

In operative use, the driver of the automobile searches to find a parking spot alongside a curb, and when he has located one that is approximately three feet longer than the length of the car, he then has ample space to park his vehicle by the present invention, which of course would be quite difficult to park in by conventional parking methods. The driver brings the front end of the car into the space first and brings the front wheels parallel to the carb C, as shown in FIGURE 1. He then depresses the "Park" button 104.

This will cause the following operation to occur. The relay CR1 (see FIGURE 12) is actuated; the solenoid 94 is actuated which unlocks the arm 28. After a small delay it actuates solenoid 125 and it directs oil pressure to a port B of the hydraulic cylinder, causing it to lower the arm. The oil source will be provided by the power steering unit of the car, or by a new power unit provided for cars not having power steering.

The arm 28 will cause switch 93 to close as the arm travels by. This will energize relay CR2 and will cause the engagement clutch 75, activated by a solenoid 126 to latch, thus disengaging the rear differential from the drive stub shaft 55, and to engage power to the fifth wheel by means of engagement of gears 64 and 77.

Energization of relay CR2 causes de-energizing of solenoid 94. The arm 28 continues travel unit it engages switch 92 which deenergizes relay CR1 to stop the arm travel. The car rear end is now lifted above the street level. The hydraulic directional valve is of the type that locks its ports when it is in a neutral position. To avoid possibility of actuating the parking system, while the car is moving, the park button 104 has power only when switch 127 is closed, this being done by the transmission lever only when it is in "Park" position.

When the car's rear is raised, the driver may control the direction of travel of the fifth wheel by selecting the transmission engagement to L (or first gear in a standard shift car) for a left swing, or R for a right swing. The throttle and brake control the speed of parking movement.

When the car is properly parked, the driver presses the "end" button 105. This energizes relay CR3 causing the following operation. Solenoid 94 is energized. Solenoid 128 is energized, which directs oil to the A port of hydraulic cylinder 81, causing it to lower the car rear end again. The solenoid 126 is then deenergized thus engaging the drive stub shaft to the rear differential and disengaging drive to the fifth wheel. The arm 28 now rotates until it trips switch 91 which will unlatch relay CR3 and will deenergize solenoids 128 and 94, thus locking the arm in horizontal retracted position.

To move the car from the parking space, the process is generally reversed. An option on vehicles having dual brake lines (shown in FIGURE 5) can result in a more perfect circling of the car into the space available. By installing a double solenoid directional valve 133 on one of the lines so that it will segregate either side of the car's brakes and be actuated by the position of the steering wheel 130 by either one of the switches 131 or 132, the driver is able, by depressing the brake pedal and turning the steering wheel in one direction, to actuate one side of the valve, thus leaving it under constant pressure. When the rear of the car is lifted, then one front wheel is braked, as long as the device is in the midst of the parking operation.

Thus there has been provided a novel device for incorporation within an automotive vehicle which will permit parking within a relatively very limited space between other automobiles.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

1. In an automobile parking device, the combination of a fifth wheel unit, and a control unit, said fifth wheel unit being mounted under the rear part of an automobile and said control unit being mounted on the dashboard of said automobile, said control unit providing remote control means for operating said fifth wheel unit to park said automobile within a limited parking space between two automobiles, wherein said fifth wheel unit comprises an arm carrying a fifth wheel at one end, said arm being centrally pivotable between a retracted horizontal position and an operative vertical position for said wheel becoming engaged upon a road surface and the other end of said arm raising said rear part of said automobile to disengage contact of the rear wheels of said automobile with said road surface, wherein said fifth wheel is rotatable about an axis extending in a longitudinal direction respective to said automobile so to transport said rear end selectively leftward or rightward, wherein said arm is comprised of a pair of bars, said bars at their one end forming a shoe, a cross channel mounted on the chassis of said automobile, said shoe being receivable within said cross channel, said fifth wheel being mounted on a cross-shaft between said bars, a sprocket affixed on said cross shaft, an endless chain around said sprocket and a second sprocket mounted on a second cross-shaft between said bars, said second cross shaft having a gear mounted thereupon engageable with a slidable transmission unit to provide rotational power to said fifth wheel.

2. The combination as set forth in claim 1, wherein said transmission unit comprises a first stub shaft, a second stub shaft, and a slidable gear member, said first stub shaft being secured at one end to a universal joint at the rear end of a drive shaft from an engine of said automobile, the other end of said first stub shaft being externally splined and received within a splined opening within said slidable gear, said first and second stub shafts being in axial alignment, the rear end of said second stub shaft carrying a bevel gear forming a component of a standard automobile rear wheel transmission, the other end of said second stub shaft being externally splined and receivable within an opposite end of said splined opening of said slidable gear, and said slidable gear being axially slidable between an engaged and disengaged position with said second stub shaft to provide selective engagement between said engine drive shaft and said rear wheel transmission, and simultaneously selective disengagement of said gear and said sliding gear.

3. The combination as set forth in claim 2, wherein said control unit comprises a housing having a front panel having a park button, an end button, a lamp indicating up position of said arm, a second lamp indicating a down position of said arm, and a third lamp indicating fifth wheel engagement and rear wheel disengagement position.

References Cited

UNITED STATES PATENTS

| 2,685,934 | 8/1954 | Coloma | 180—1 |
| 2,708,002 | 5/1955 | Carpenter | 180—1 |
| 2,819,766 | 1/1958 | Bisceglie | 180—1 |

FOREIGN PATENTS

| 563,083 | 5/1957 | Italy. |

A. HARRY LEVY, *Primary Examiner.*